United States Patent [19]

Ho

[11] 3,735,358

[45] May 22, 1973

[54] SPECIALIZED ARRAY LOGIC

[75] Inventor: Irving T. Ho, Poughkeepsie, N.Y.

[73] Assignee: International Business Machines Corporation, Armonk, N.Y.

[22] Filed: Dec. 31, 1970

[21] Appl. No.: 103,087

[52] U.S. Cl. ............340/173 R, 307/238, 340/173 SP

[51] Int. Cl. ..........................G11c 11/40, G11c 17/00

[58] Field of Search .....................340/173 R, 173 SP; 307/238, 279, 215

[56] References Cited

UNITED STATES PATENTS

| | | | |
|---|---|---|---|
| 3,529,299 | 9/1970 | Chung | 340/173 SP |
| 3,404,382 | 10/1968 | Rosenbeck | 340/173 SP |

*Primary Examiner*—Bernard Konick
*Assistant Examiner*—Jay P. Lucas
*Attorney*—Hanifin & Jancin and Kenneth R. Stevens

[57] ABSTRACT

A read only memory comprising a plurality of semiconductor device cells arranged in rows and columns. Spaced conductive lines extending in a Y direction are connected to a first cell terminal. A plurality of second cell terminals defining a row or column are selectively interconnected to one or the other of a pair of adjacent X lines. The semiconductor device cells interconnected between the adjacent X line pair are responsive to digital input signals applied on the plurality of Y lines to generate distinct logical signals on the pair of adjacent X lines.

10 Claims, 6 Drawing Figures

INVENTOR
IRVING T. HO

BY Kenneth R. Stevens
ATTORNEY

SPECIALIZED ARRAY LOGIC

SUMMARY OF THE INVENTION

This invention relates to monolithic memories, and more particularly to read only memories adaptable for implementation in monolithic form.

In the prior art read only memory array, FIG. 1, a plurality of device cells are arranged in rows and columns and are connected to lines X1, X2, and Y1 . . . Y4. The individual cells comprising NPN transistors are connected to an X1 or X2 line via an emitter terminal in order to store a binary 1. The emitter terminal of the transistor is left unconnected in order to store a binary 0.

Each of the transistors TX1 . . . TX8 are responsive to a digital input signal, for example, A, $\overline{A}$, B, $\overline{B}$ applied via the Y lines in order to generate an output function A + B on output terminal 10 and an output function $\overline{A}$ + $\overline{B}$ on output terminal 12 via respective reference transistors TX9 and TX10 and their associated biasing resistors R and R1. The unconnected cell transistors can be entirely omitted from the memory array since they are completely non-functional. However, the connected and unconnected scheme is generally employed because the overall memory is more readily personalized. That is, in monolithic fabrication, a cell or transistor is located at each coordinate location. A user is then able to render specific cells non-functional or functional in accordance with the particular logic desired.

In the present invention, it is realized that in numerous read only memory applications, many of the cells locations are used to store binary 0's. For certain logical functions, as high as 80 percent of the cell locations are used to store binary 0's. This gives rise to an overall bit pattern arrangement for most read only memories which allows numerous unconnected cells or binary 0 cells to be entirely omitted and the connected or binary 1 cells to be selectively interleaved without loss of logic capacity.

Therefore, it is an object of the present invention to provide a monolithic read only memory of reduced size and power requirements.

Another object of the present invention is to provide a monolithic read only memory of reduced size and power requirements with a fewer number of device cells, but with sufficient logical capacity for many applications.

Another object of the present invention is to provide a monolithic read only memory having a reduced number of cells without much loss in logical capacity, and in addition, being advantageously implementable by personalization techniques.

A further object of the present invention is to provide a monolithic read only memory of reduced area and power requirements with attendant increased fabrication yields.

The present invention virtually stores 2 bits of information in a single coordinate location of a monolithic read only memory array by selectively sharing adjacent conductive lines between a plurality of semiconductor cells.

The foregoing and other objects, features and advantages of the invention will be apparent from the following more particular description of the preferred embodiment of the invention as illustrated in the accompanying drawings.

DESCRIPTION OF THE PREFERRED EMBODIMENT

Figure 1:
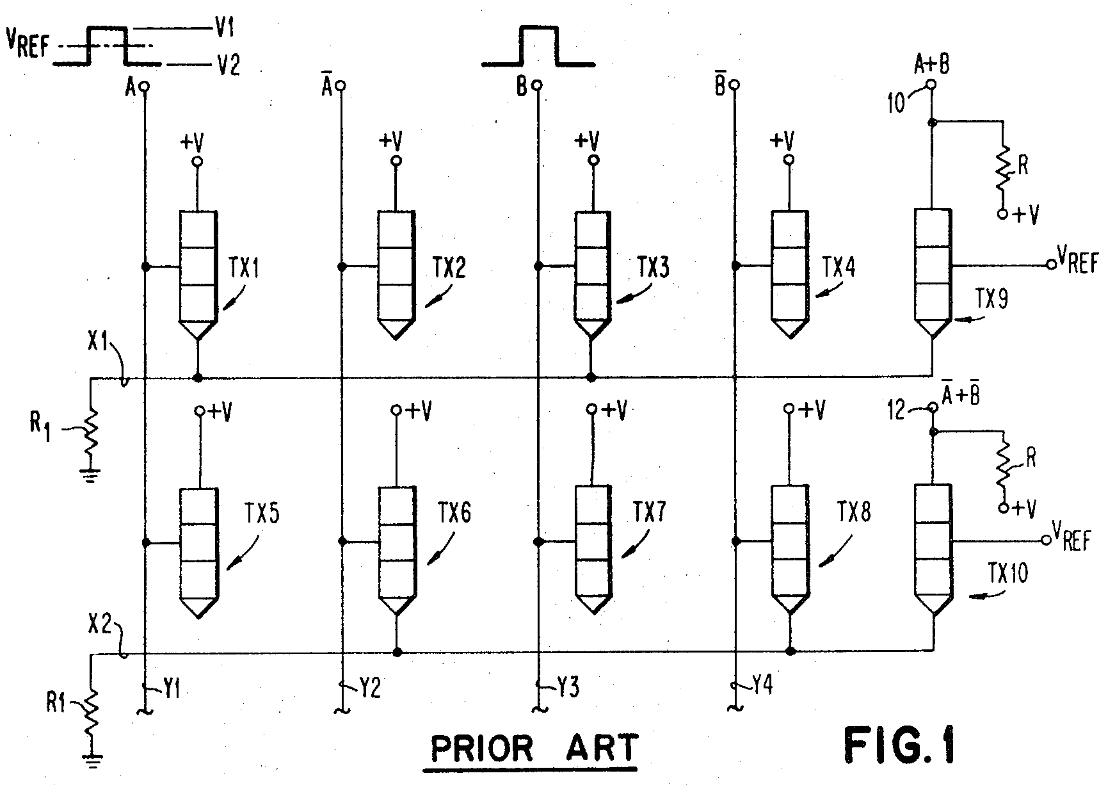
FIG. 1 is an electrical schematic illustrating a prior art read only memory array.
Figure 2:
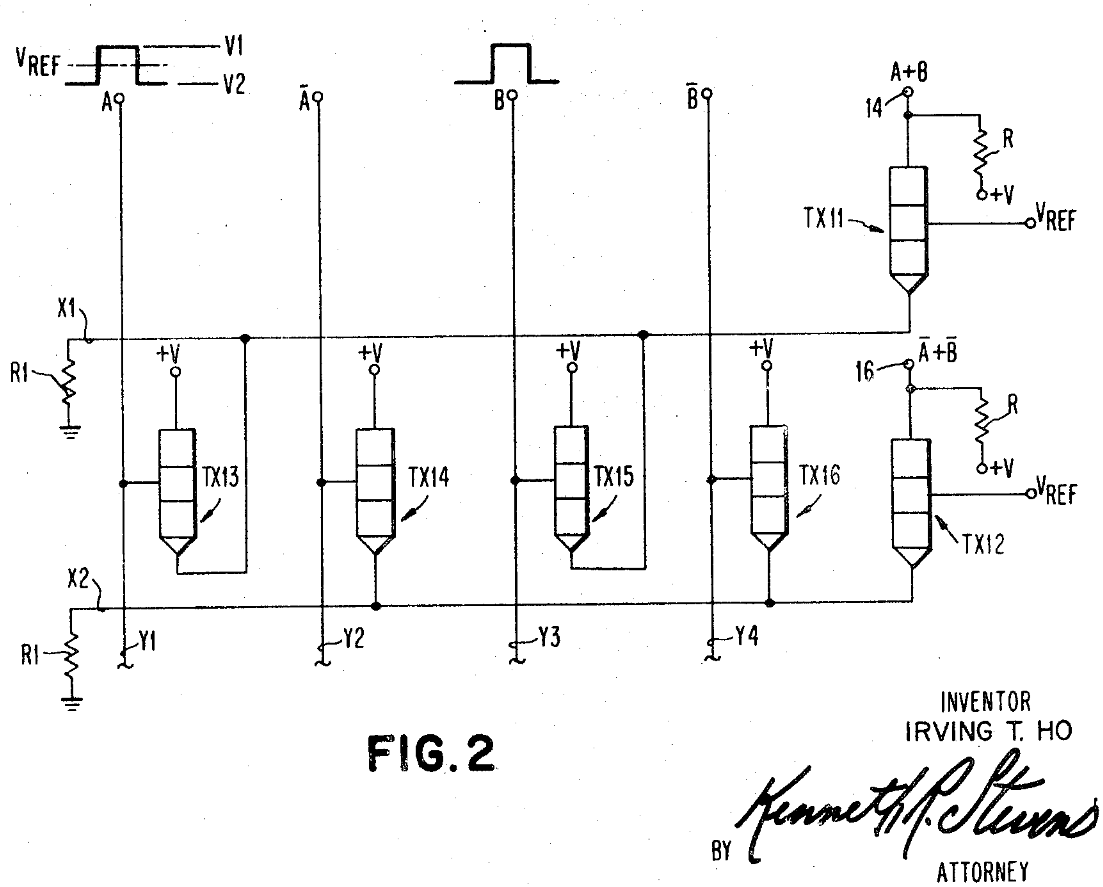
FIG. 2 is a schematic diagram illustrating the present invention.
Figure 3:
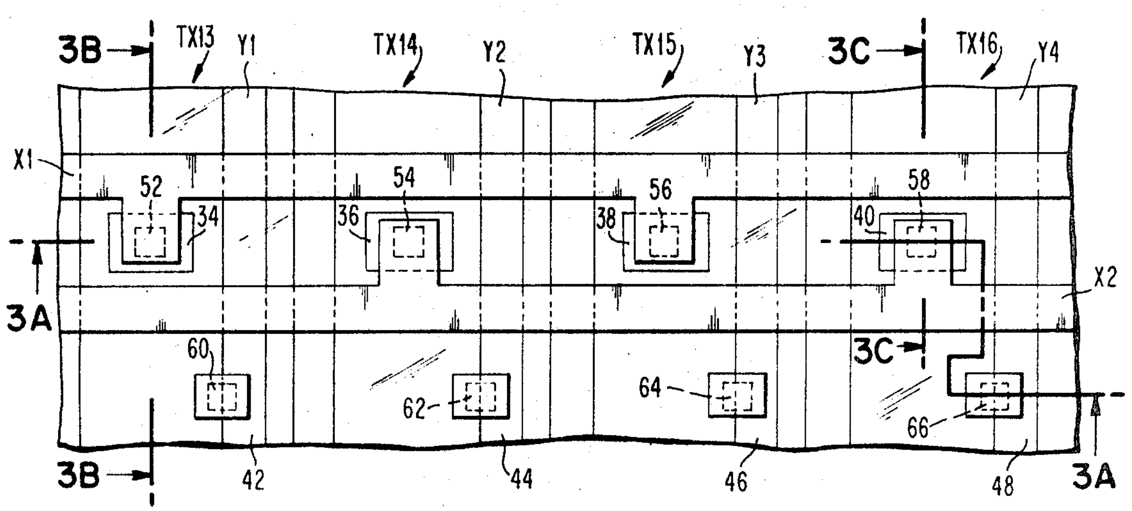
FIG. 3 is a monolithic version of the invention shown in FIG. 2.
Figure 3A:
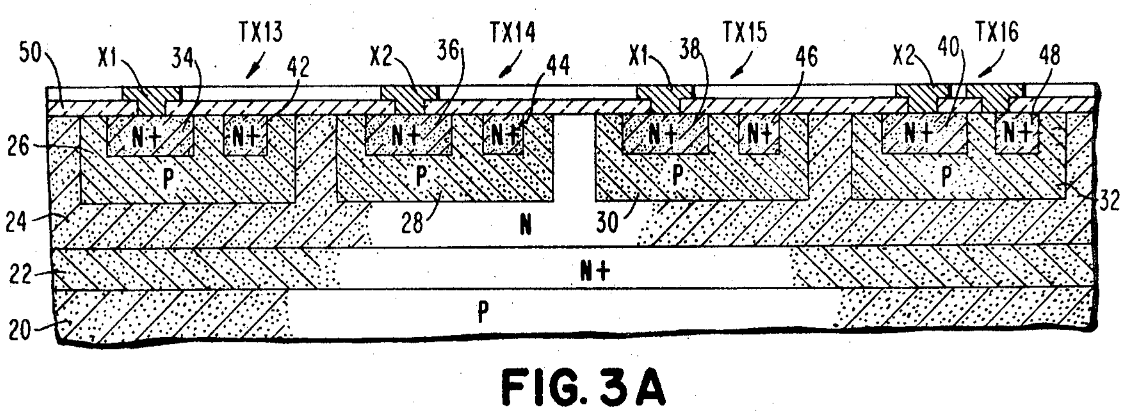
FIG. 3A is a partial cross-sectional view taken along lines 3A—3A of FIG. 3.
Figure 3B:
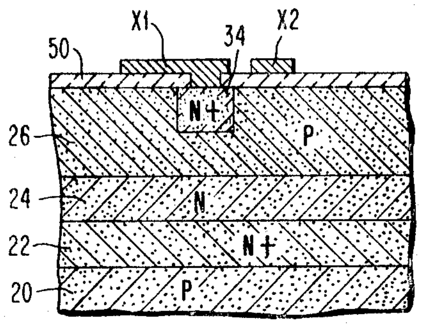
FIGS. 3B and 3C are cross-sectional views taken along lines 3B—3B and 3C—3C of FIG. 3.
Figure 3C:
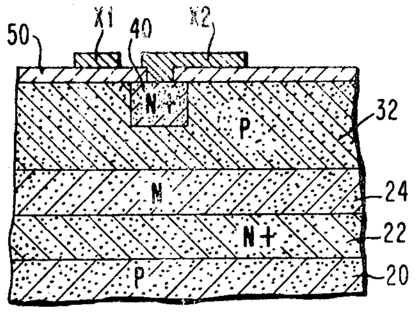

Now referring to FIG. 2 of the present invention, it illustrates the storage of 2 bits of data in a single coordinate location without diminishing the logical capacity of the read only memory. The input digital signal A, $\overline{A}$, B, $\overline{B}$ is applied via a plurality of lines designated Y1 . . . Y4. The pair of X direction lines X1 and X2 are connected to respective output terminals 14 and 16 via output reference transistors TX11 and TX12. Each of the reference transistors is connected by their base terminal to a source of reference voltage $V_{REF'}$ , and at their collector terminals to a biasing resistor R. The other end of the X1 and X2 lines are also connected to biasing resistors R1.

The present invention significantly reduces the overall semiconductor chip area as well as the number of individual cells required in a read only memory by selectively interleaving the functional or connected cell transistors in adjacent rows or columns, and omitting the non-functional cell transistors, i.e., unconnected, in adjacent rows or columns. This selective interleaving is accomplished by allowing a single row or column of cell transistors to selectively share immediately adjacent conductive lines extending in the same direction. Accordingly, for the illustrated logic functions, the eight transistors TX1 . . . TX8 are reduced in number to only four transistors TX13, TX14, TX15 and TX16. Transistor TX13 is connected via its base terminal to the Y1 line and its emitter is connected to the X1 line so as to serve the identical function previously required by the two transistors TX1 and TX5. Similarly, transistor TX14 is connected via its base terminal to the Y2 line and its emitter is selectively connected to the X2 line. Transistor TX14 thus operatively performs the identical function previously required by the pair of transistors TX2 and TX6. Transistors TX15 and TX16 are similarly connected to the X1 and X2 lines. Hence, the cell transistors TX13 . . . TX16 are responsive to the applied input signal to generate the logical function A + B at output terminal 14, and the logical function $\overline{A}$ + $\overline{B}$ at output terminal 16.

The preferred embodiment is illustrated by selectively connecting the emitter terminal of a cell transistor to one or the other of an adjacent conductive line or leaving it unconnected while connecting the base terminal of the cell transistor to a separate orthogonal line. However, the invention is equally applicable to an implementation wherein all the emitter terminals of the cell transistors defining a row or column are connected to the same line while the base terminal is selectively connected to one or the other of adjacent conductive lines running in an orthogonal direction. Although the invention is illustrated for a single row, in actual application the read only memory comprises numerous rows for performing a great number of logical functions.

MONOLITHIC IMPLEMENTATION

The X and Y direction lines, as well as the cell transistors TX13, TX14, TX15, and TX16 are readily implemented in monolithic form as illustrated in FIGS. 3, 3A, 3B and 3C. The entire array is fabricated on a P type semiconductor substrate 20. Thereafter, an N+ region 22 is diffused into the P type substrate 20 to form a subcollector region. Next, an N epitaxial region 24 is deposited over the N+ subcollector region 22. Using conventional photolithographic masking and etching techniques, the transistors TX13, TX14, TX15 and TX16 next are formed into the epitaxial region 24. A plurality of P type diffusions are employed to form four elongated base regions 26, 28, 30 and 32. Next, an N+ diffusion over a suitable mask simultaneously forms the plurality of emitter regions 34, 36, 38, and 40 into their associated base regions. Simultaneous with the emitter diffusions, a plurality of N+ regions 42, 44, 46, and 48 are also formed in the separate base regions. These latter N+ regions constitute the Y1 . . . Y4 lines.

Thereafter, a silicon dioxide insulation layer 50 is deposited over the upper surface of the devices and appropriate contact holes are etched therethrough. Openings 52, 54, 56, and 58 provide access to the respective emitter regions. Similarly, openings 60, 62, 64 and 66 provide access to each of the separate elongated base regions. Metalized lines X1 and X2 are then selectively deposited over the silicon dioxide layer 50 in order to connect the X1 line with the emitter regions 34 and 38. The metalized X2 line is deposited over the silicon dioxide layer 50 in order to connect it with the emitter regions 36 and 40. Metalized depositions are made through the openings 60, 62, 64 and 66 in order to connect each of the base regions with their associated diffused Y lines.

Although the invention has been particularly shown and described with reference to the preferred embodiments thereof, it will be understood by those skilled in the art that the foregoing and other changes in form and details may be made therein without departing from the spirit and scope of the invention.

What is claimed is:

1. A read only memory comprising:

a. a semiconductor body, b. a plurality of cells formed in the semiconductor body, the plurality of cells being located in a matrix of rows and columns, c. a plurality of spaced X lines adapted for support by the body and adapted to receive input digital signals, d. a plurality of Y lines adapted for support by the semiconductor body, e. the plurality of cells each comprising first and second semiconductor regions formed in the body, f. each X line being connected to a plurality of the first regions defining a row, g. selected second regions defining a column being connected to a first one of the Y lines, h. a second Y line immediately adjacent the first Y line being connected to selected second regions in the same column.

2. A read only memory as in claim 1 wherein:

a. the plurality of cells comprise transistors including a collector region, a base region constituting the first region, and an emitter region constituting the second region, b. the adjacent first and second Y lines comprising a conductive metalized line pair, and c. selected emitter regions defining the column being connected to the first Y line, and selected emitter regions defining the same column being connected to the second Y line.

3. A read only memory as in claim 2 wherein:

a. the X lines comprise diffused regions located in the semiconductor body and connected to a plurality of base regions, b. a voltage source means connected to the collector regions, and c. the plurality of cells being responsive to the input digital signals for generating separate distinct signals on the adjacent Y line pair, the distinct signals being indicative of different logic functions.

4. A read only memory array adaptable for fabrication in monolithic form comprising:

a. a first group comprising a plurality of lines extending in a first direction, b. a second group comprising a plurality of lines extending in a second direction, c. the first and second groups being located to define a plurality of coordinate locations, d. the plurality of lines in the second group being adapted to receive digital input signals, e. a first line in the first group having a first output terminal means, f. a second line in the first group being spaced from and adjacent to the first line and having a second output terminal, g. a plurality of semiconductor device means located between the first and second adjacent lines at different coordinate locations and defining a row or column, h. each semiconductor device being connected to different ones of the plurality of lines in the second group, and predetermined semiconductor device means also being selectively connected to either the first or to the second adjacent lines in the first group, and i. the plurality of semiconductor devices being operatively responsive to the digital input signals for simultaneously generating a first output signal on the first output terminal representative of a first logical function and a second output signal on the second output terminal representative of a second logical function.

5. A read only memory array adaptable for fabrication in monolithic form as in claim 4 further including:

a. a semiconductor body, b. the plurality of semiconductor devices comprising a plurality of integrated circuit transistors located in the semiconductor body, each transistor including a first control terminal connected to its associated line in the second group, and each transistor including a second control terminal, predetermined second control terminals being selectively connected to either the first or the second adjacent line in the first group so as to store more than 1 bit of information for a single coordinate location.

6. A read only memory array adaptable for fabrication in monolithic form as in claim 5 wherein:

a. the first adjacent line comprises a metalized line located over the transistors, b. the second adjacent line comprises a metalized line located over the transistors, c. the plurality of transistors defining a row or column each comprising base, emitter, and collector regions, d. each base region being connected to its associated metalized line in the second group, and e. predetermined emitter regions being selectively connected either to the first or the second adjacent metalized line in accordance with the first or second logical function.

7. A read only memory array adaptable for fabrication in monolithic form as in claim 5 wherein:

a. the array includes a plurality of rows and columns of integrated circuit transistors for substantially storing the logical states for 2 bits of information in a single coordinate location.

8. A read only memory array adaptable for fabrication in monolithic form comprising:

a. a substrate, b. a plurality of integrated circuit semiconductor devices located in the substrate so as to define a plurality of rows and columns of semiconductor devices, each semiconductor device having at least first and second control terminals, c. a first group of spaced conductive lines adapted to receive a digital input signal, d. means for connecting each first terminal of a semiconductor device to an associated line in the first group, e. a second group comprising a plurality of spaced conductive lines located in substantially orthogonal relationship to the first group of lines, f. the semiconductor devices defining rows and columns comprising a plurality of semiconductor regions of different conductivity type, the plurality of regions being located between pairs of adjacent first and second lines in the second group, g. the second terminal of predetermined semiconductor devices in a single row or column being selectively connected to either the first or to the second line of its associated pair, and h. the semiconductor devices in the same single column or row being responsive to the digital input signal for simultaneously generating a first signal representative of a first function on the first line of an associated pair and a second signal representative of a second function on the second line of the same associated pair such that a single device is capable of substantially storing the logical states for 2 bits of information.

9. A read only memory array adaptable for fabrication in monolithic form as in claim 8 wherein:

a. the plurality of regions for each semiconductor device are constituted by base, emitter, and collector regions, b. the first and second lines of a pair in the second group comprise metallized lines, c. means for connecting each base region of each semiconductor device to an associated line in the first group, and d. means for connecting selected emitter regions in a row or column to either the first or the second metallized lines of its associated pair.

10. A read only memory array adaptable for fabrication in monolithic form comprising:

a. a body of semiconductor material, b. at least one row or column comprising a plurality of semiconductor devices located in the body of semiconductor material, c. each semiconductor device having at least a first and a second semiconductor region of opposite conductivity type, a first terminal opening associated with each first region and a second terminal opening associated with each second region, d. a first plurality of spaced conductive lines extending in a first direction and adaptable for connection to the semiconductor devices and to an input digital word, e. means for connecting the first region of each semiconductor device to separate ones of the first plurality of lines, f. at least a pair of first and second spaced conductive lines extending in a second direction and adaptable for connection to the semiconductor devices, g. the second regions of the semiconductor devices constituting a row or column being situated between the pair of first and second spaced conductive lines, and means for selectively connecting predetermined second terminals to one or the other of the first and second spaced conductive lines extending in the second direction, and h. the semiconductor devices in the row or column being responsive to the digital word for simultaneously generating a first and second signal on the first and second spaced conductive lines extending in the second direction, respectively, the first and second signals being representative of different logical functions.

* * * * *